May 4, 1937.  F. T. COURT  2,079,547
HARVESTER
Filed April 16, 1931  6 Sheets-Sheet 1
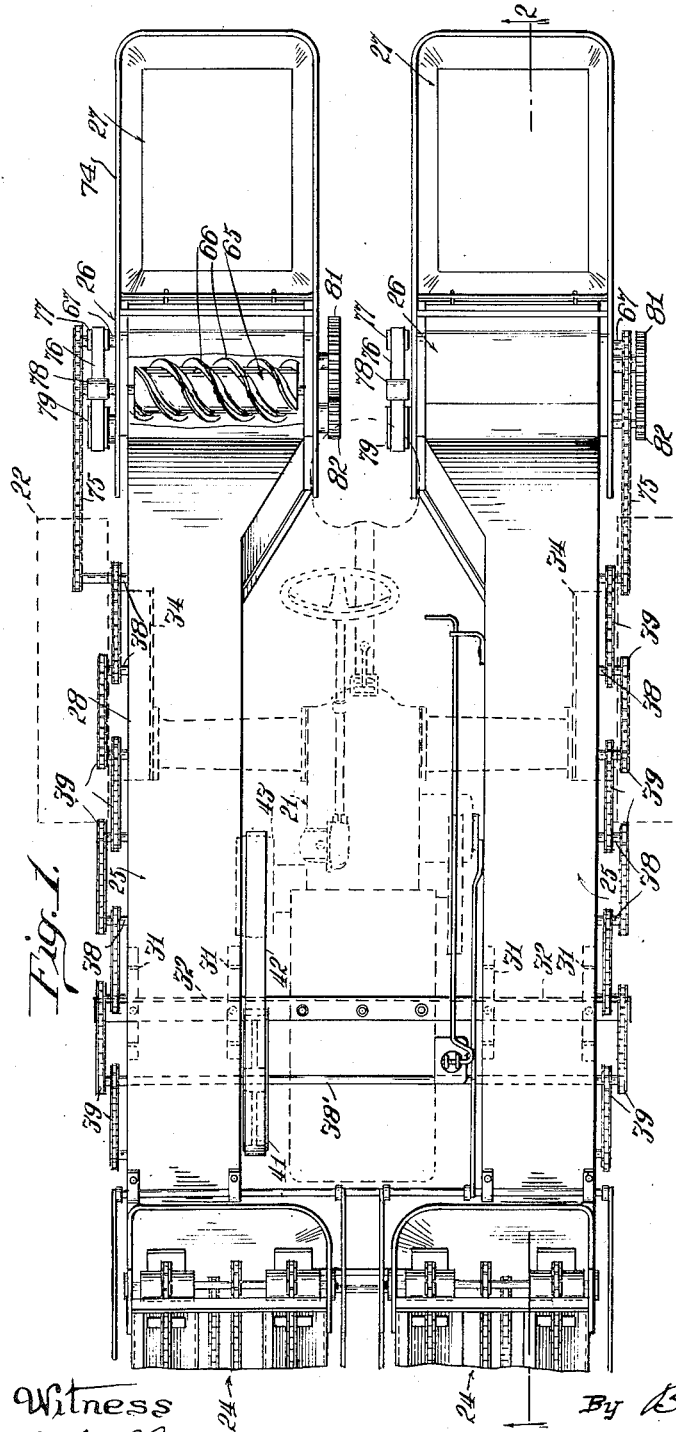

May 4, 1937.  F. T. COURT  2,079,547
HARVESTER
Filed April 16, 1931  6 Sheets-Sheet 2
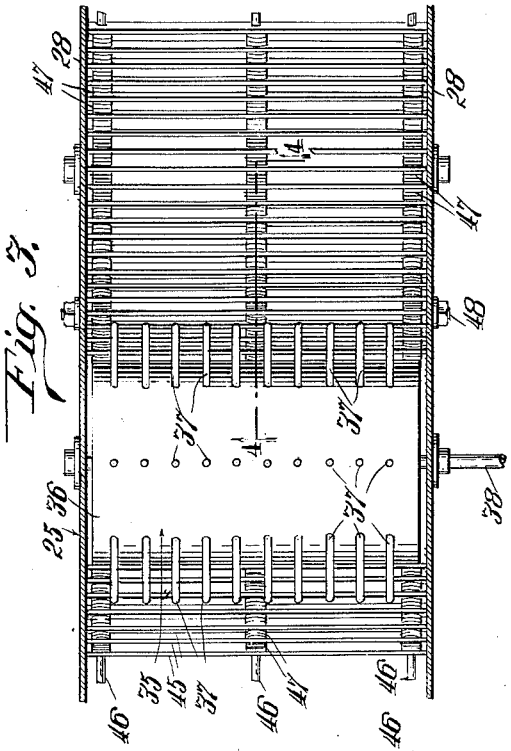
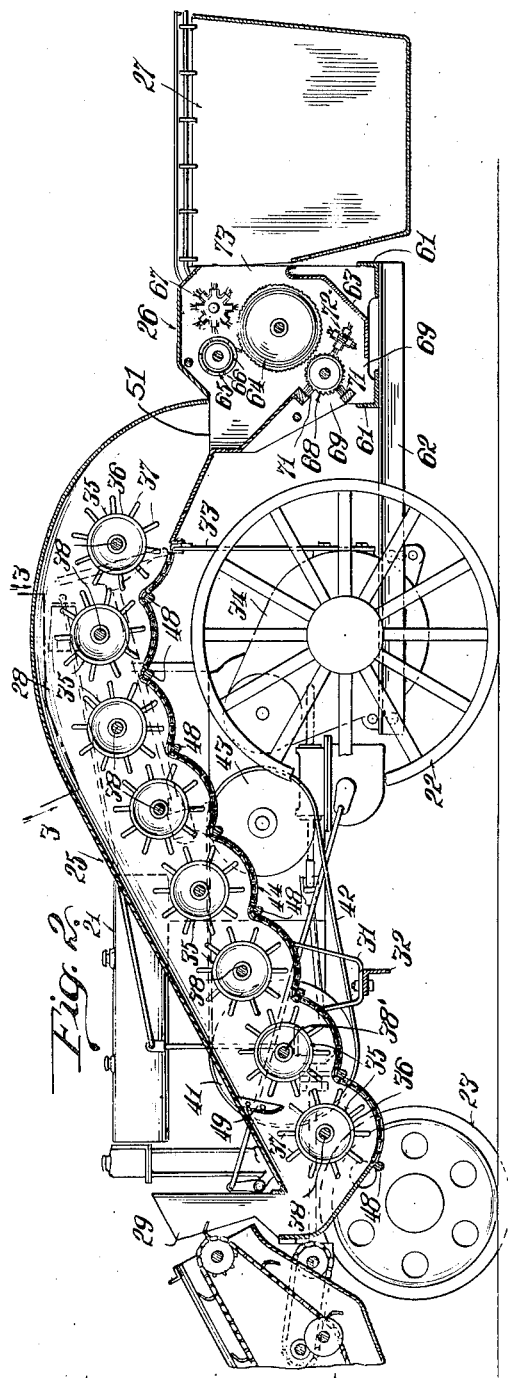
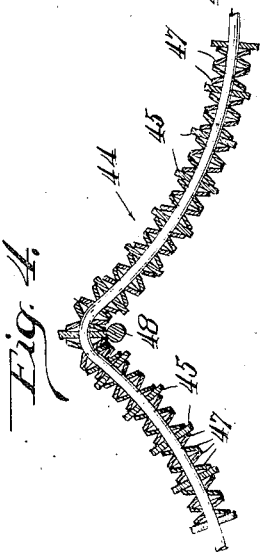
Inventor
Frank T. Court
Witness
Milton Lenoir
By Brown, Jackson, Boettcher & Dienner
Attorneys May 4, 1937. F. T. COURT 2,079,547
HARVESTER
Filed April 16, 1931 6 Sheets-Sheet 3
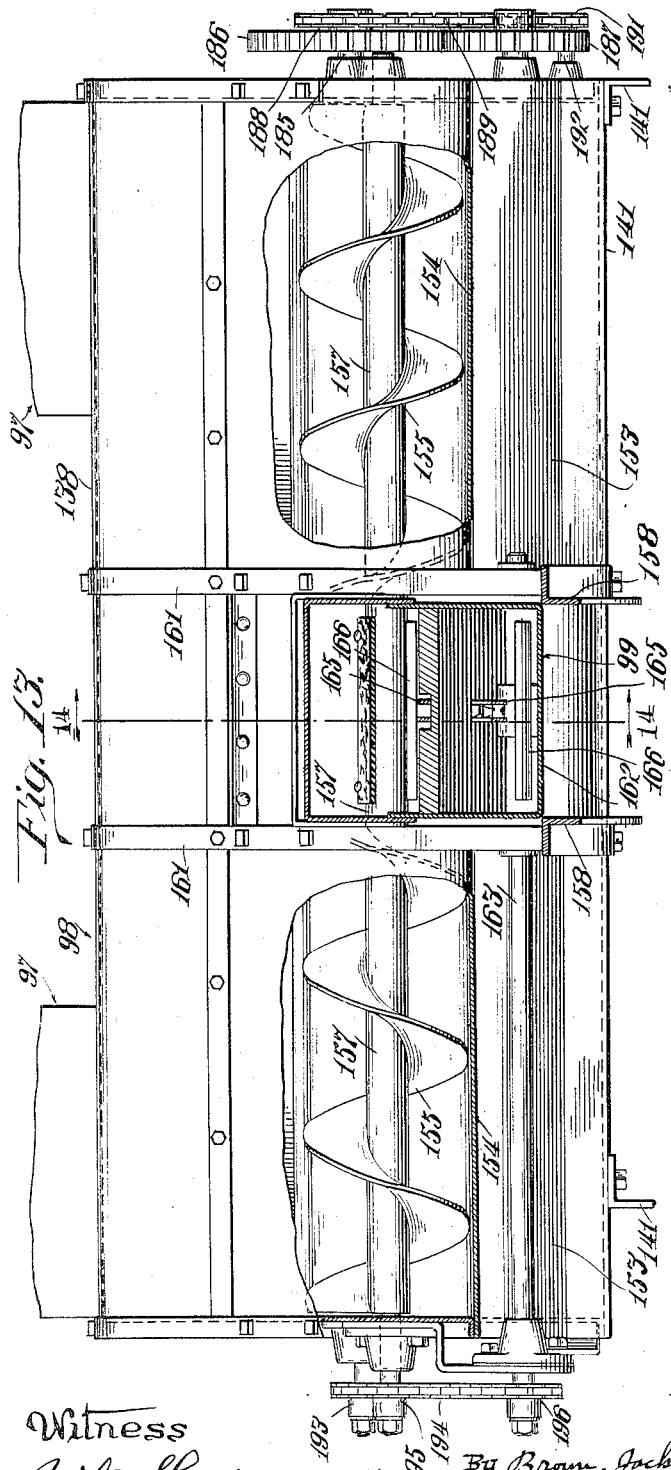
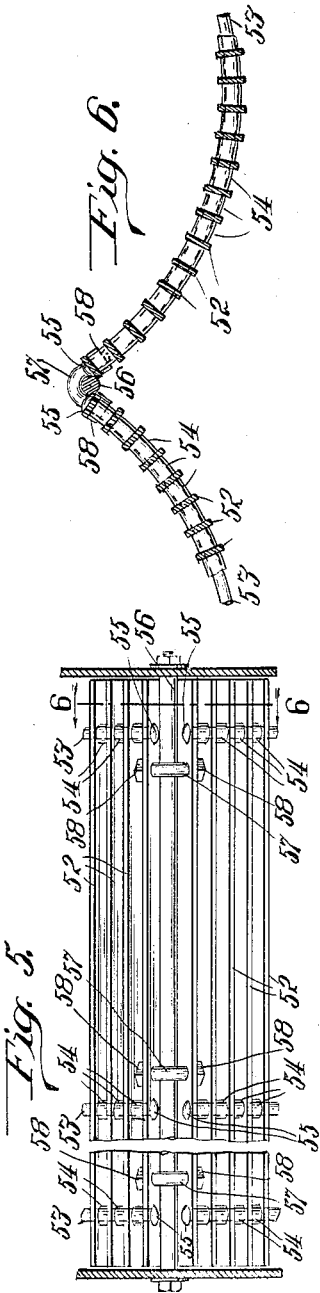
Inventor
Frank T. Court
By Brown, Jackson, Boettcher & Dienner
Attorneys.
Witness
Milton Lenoir

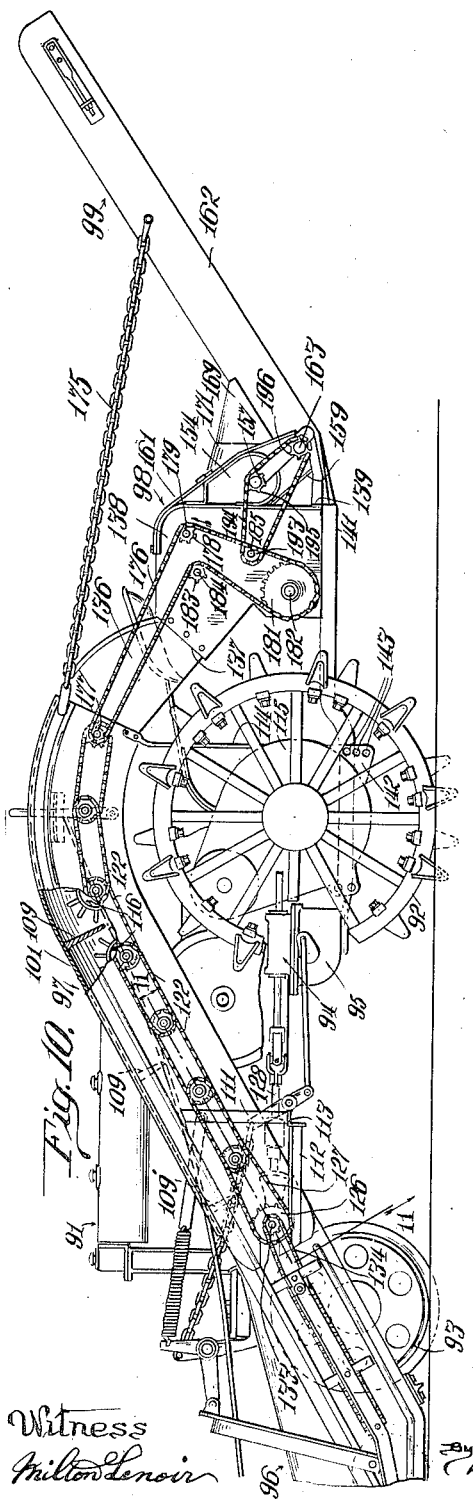

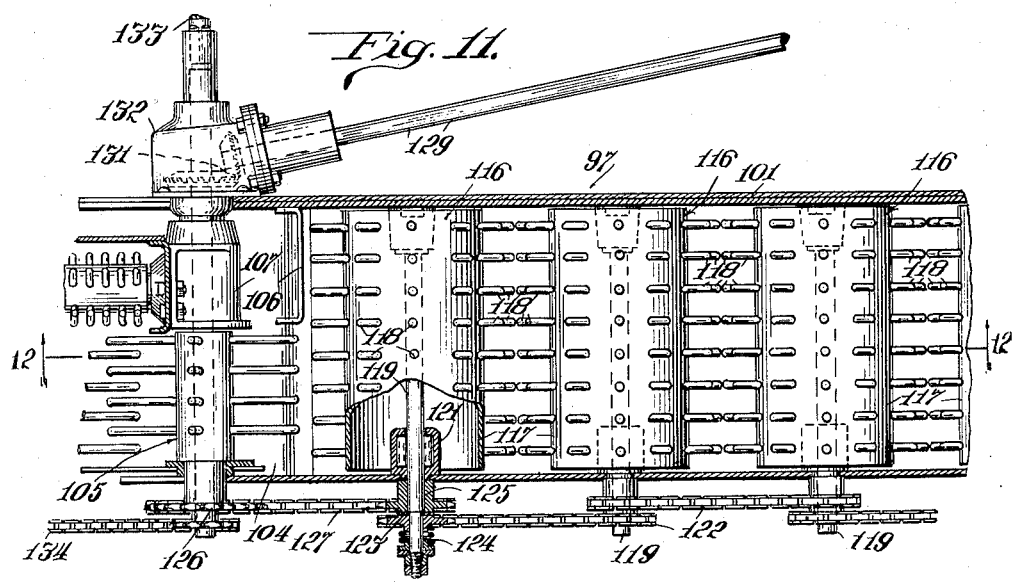
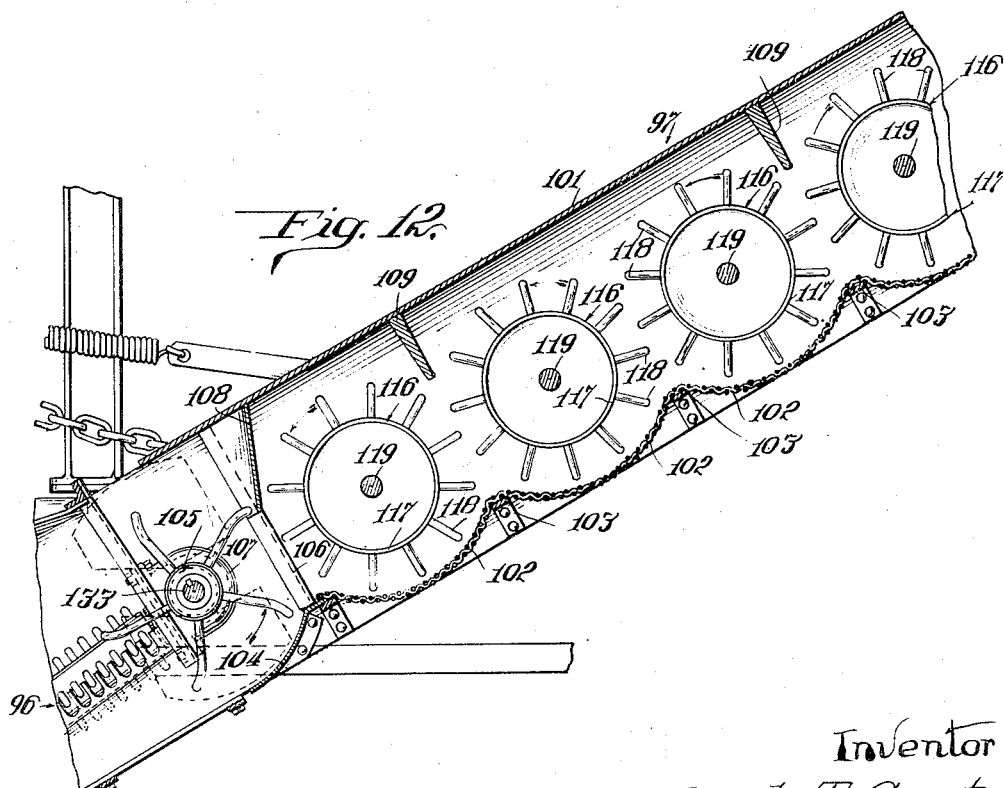

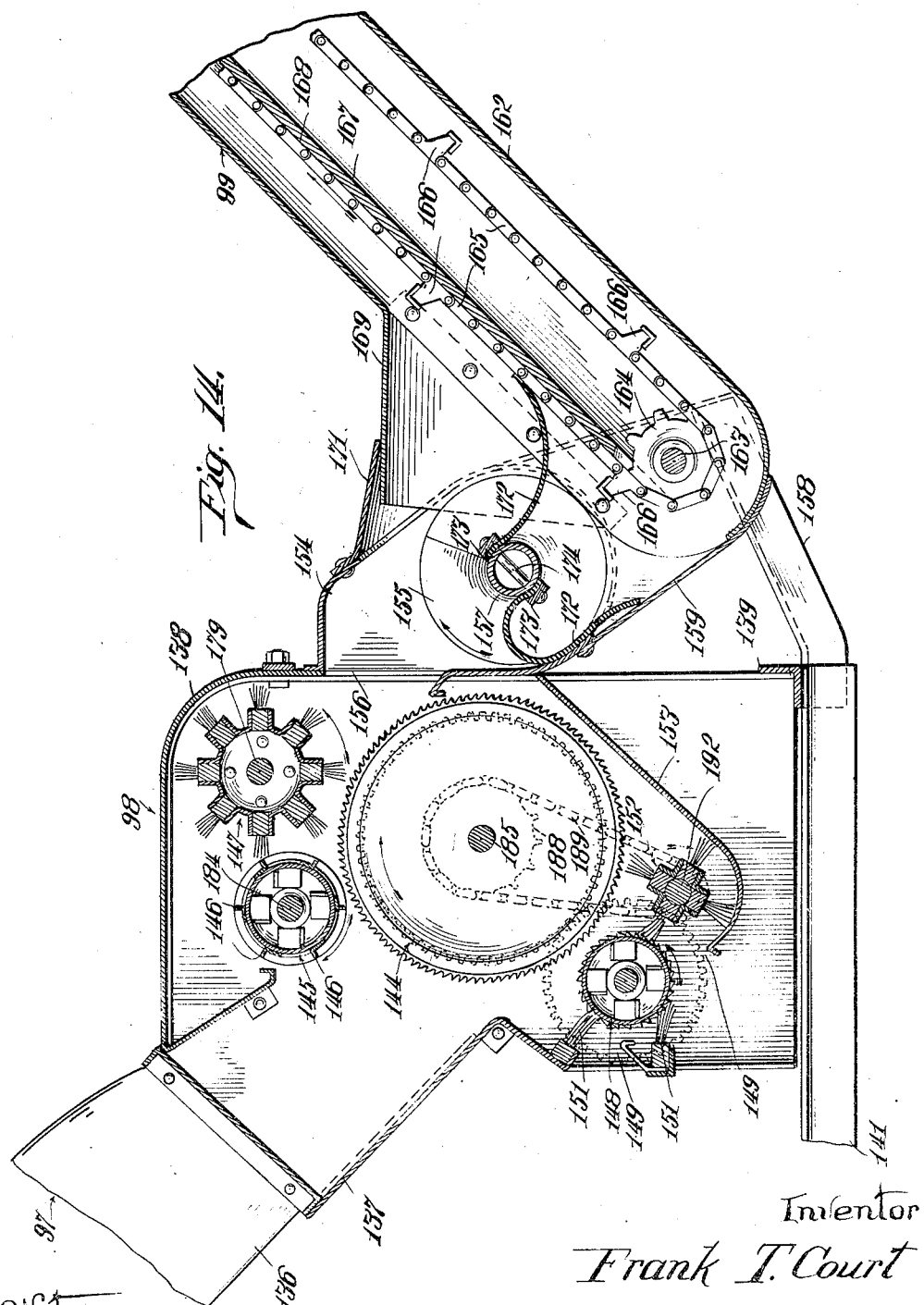

Patented May 4, 1937

2,079,547

UNITED STATES PATENT OFFICE 2,079,547

HARVESTER

Frank T. Court, Moline, Ill., assignor to Deere & Company, Moline, Ill., a corporation of Illinois Application April 16, 1931, Serial No. 530,452

6 Claims. (Cl. 19—37)

This invention relates to harvesters, and more particularly to cotton harvesters of the type adapted to be removably supported upon a tractor and to be operated therefrom by suitable power take-off connections. The present invention has particular application to two-row harvesters because of the desirability of large capacity and rapidity of operation, but it will be understood that the invention may also be embodied in a one-row machine.

More specifically, the present application is directed to subject matter originally shown, described and claimed in my prior filed copending applications, Serial No. 439,888, filed March 29, 1930, for Harvester, now Patent No. 2,001,078, issued May 14, 1935, and Serial No. 519,926, filed March 4, 1931, for Cotton harvester, now Patent No. 2,001,079, issued May 14, 1935, of each of which the present application is a continuation-in-part.

In general, each of the aforementioned applications discloses a cotton harvester adapted to be carried as an attachment by a general purpose tractor comprising a pair of forwardly and downwardly directed stripping mechanisms each provided with means for engaging and guiding cotton plants therebetween and stripping cotton therefrom, such mechanisms being preferably mounted forwardly and in advance of the tractor with which the mechanisms are associated for transport and operation. The stripping means is preferably of the type provided with projecting prongs or fingers which in operating upon the plants strip cotton bolls from the plant stalks or branches, the arrangement being such that two adjacent rows may be operated upon concurrently. The cotton bolls removed from each row of plants by the stripping means are carried rearwardly of each stripping mechanism into a combined conveyor and preliminary cleaner associated with each stripping mechanism, this combined conveyor and preliminary cleaner carrying the stripped matter rearwardly and concurrently separating the cotton from the bolls and breaking up all stalks and twigs stripped from the cotton plants together with the cotton bolls. Each of the combined conveyor and preliminary cleaners discharges into final cleaning means, whence the cotton is then delivered to suitable receptacles or containers for transport.

The particular stripping means and the association of this means with the tractor and with the combined conveyors and preliminary cleaning means and the relative association of these mechanisms with the tractor constitute the subject matter of the aforementioned copending applications. The present application, is more particularly directed to the combined conveying and preliminary cleaning means and the final cleaning means together with their relative association in cooperative relation.

With the above in view, it is an object of the present invention to provide improved combined conveying and preliminary cleaning means adapted for association with a tractor capable of efficiently carrying out a combined conveying and preliminary cleaning function.

Another object resides in the provision of such means as readily lends itself for association with a general purpose tractor, the means being so arranged as to be readily mounted upon the tractor and to carry out its particular function in a simple and efficient manner without requiring any modification or alteration of the tractor.

A further object resides in the provision of such a combined conveying and preliminary cleaning means as will be readily capable of association with stripping means of the character briefly hereinbefore described and with final cleaning means in such a manner as to effectively cooperate with such mechanisms whereby in associated relationship with the mechanisms the combined conveying and preliminary cleaning means will function in a manner to provide continuity of operation.

Another object resides in the provision of such a combined conveying and preliminary cleaning means as may be readily associated with stripping means and final cleaning means as an intermediate link in a chain of continuous operation, its function being such as to efficiently operate upon matter delivered to it by the stripping means and the arrangement being such that it will deliver cotton to the final cleaning means in condition for proper operation thereupon by such final cleaning means.

A further object resides in the provision of such a combined conveying and preliminary cleaning means as will be substantial in structure, durable and rugged and so constructed and arranged as to efficiently operate upon matter received thereby in such a manner as to provide for continuous conveying and simultaneous cleaning of the cotton, its conveying function being maintained at a high rate of efficiency to adequately meet the demands placed thereupon particularly due to variations in abundance of cotton yield of plants operated upon. It will be readily apparent that plants do not bear a yield of uniform abundance and due to such irregularities in abundance, the demands which may be placed upon the mechanisms will vary as the entire machine travels down a plant row or rows. Consequently, during sparser portions of the rows the demands placed upon the mechanism would be small compared with demands which might be imposed upon the mechanism when it encounters more abundant yield bearing plants. It is therefore desirable that the mechanism be such as to effectively function to accommodate, without any slowing up of the harvesting operation, the demands which may be placed thereupon.

Another feature of the present invention resides in the provision of such a combined conveying and preliminary cleaning means which is provided with means for effectively permitting foreign matter to be deposited upon the ground and at the same time will function to retain cotton being conveyed therethrough. To this end, the mechanism is provided with an open-work bottom of novel structural characteristics which will effectively cooperate with the means operating upon the combined cotton and such foreign matter as may be introduced into the mechanism to effect ready separation of foreign matter from the cotton desired to be retained and to be subsequently cleaned prior to transport to the gin.

Accordingly, a further object of the present invention resides in the provision of novel open-work bottoms or screens for association with the combined conveying and preliminary cleaning means.

Another object resides in the provision of such a combined conveying and preliminary cleaning means which is arranged to be so associated with a stripping mechanism embodying means effective to remove foreign matter as to provide in effect a continuous cooperation with the stripping mechanism whereby the resultant effects of the combined conveying and preliminary cleaning means is substantially cumulative to the effect of the stripping means whereupon matter discharged by the combined conveying and preliminary cleaning means will have been more efficiently acted upon to remove foreign matter from cotton desired to be retained and transmitted to final cleaning means.

The combined conveying and preliminary cleaning means hereinbefore referred to has for its major function the transmission of stripped matter removed from the plants from the stripping mechanisms rearwardly of the combined mechanism in its association upon a tractor for suitable discharge at the rear end of the tractor whereby the effective operation is such as to permit the mechanism to move down the rows of plants at a substantially rapid rate. Associated with this function of transmission, is also the function of removing from the cotton desired to be eventually retained, the major portion of larger particles of foreign matter such as would be undesirable in the cotton eventually transported and delivered for operation thereupon by the gin. While the combined conveying and preliminary cleaning means are effective to remove the larger particles of foreign matter, such cotton as is finally discharged from these mechanisms may still retain a considerable portion of fine particles of foreign matter which would of course be undesirable. Accordingly, the present invention further contemplates the provision of improved means adapted to cooperate with the combined conveying and preliminary cleaning means for effecting the removal of smaller particles of foreign matter prior to the transport of the cotton to the gin.

To this end, it is another object of the present invention to provide improved final cleaning means readily associable with the combined conveying and preliminary cleaning means in such a manner as to receive matter discharged from such combined conveying and preliminary cleaning means and to effectively remove such small particles of foreign matter as may find their way through the combined conveying and preliminary cleaning means.

A further object resides in the provision of such a final cleaning means as may be readily associated with the combined conveying and preliminary cleaning means in a manner wherein the final cleaning means may act as a link in the chain of continuous operation from the combined conveying and preliminary cleaning means to the final discharge of the cleaned cotton to the desired receptacle which is adapted to transport or convey the cleaned cotton to the gin.

Another object resides in the provision of such a final cleaning means as will uniformly operate upon cotton introduced thereinto in a rapid and concurrently efficient manner at a rate commensurate with the demands which may be placed thereupon due to crop yield abundance variations of the particular plant rows operated upon.

A further object resides in the provision of novel final cleaning means which is adapted for association with a two-row mechanism wherein the parts are adapted to receive cotton for final cleaning from both plant row yields and effectively operate thereupon to a point of maximum efficiency irrespective of variations in abundance of the yield.

Another object resides in the provision of such a final cleaning means as embodies novel structure wherein cotton conveyed thereto may be effectively carried to a common discharge conveyor which is adapted to discharge the cleaned cotton to a transportable vehicle drawn by the tractor upon which the harvesting mechanism is carried.

A further object resides in the provision of novel means in such a final cleaning means as will efficiently feed the finally cleaned cotton discharged by the final cleaning means to the discharge conveyor in a uniform and positive manner whereby the rate of discharge of the cotton by the final cleaning means may be commensurate with the demands imposed upon the entire mechanism thereby insuring of efficient discharge of the finally cleaned cotton to the transport receptacle at a rate permitting traveling of the entire mechanism down a plant row or rows at a relatively uniform speed requiring the attention of only one operator.

Other and further features, objects and advantages of the present invention will appear from the following detailed description of the several preferred embodiments of the invention illustrated in the accompanying drawings, in which:

Figure 1 is a plan view of a harvester embodying the salient features of the present invention illustrated in assembled relation upon a general purpose tractor which is shown in dotted lines, with the major portions of the stripping mechanisms omitted, parts being broken away;

Figure 2 is a side elevation of the mechanism illustrated in Figure 1, the side of the mechanism nearest the observer being shown in section, such section being taken substantially along the line 2—2 of Figure 1;

Figure 3 is an enlarged fragmentary sectional view taken substantially along the line 3—3 of Figure 2;

Figure 4 is a section taken substantially along the line 4—4 of Figure 3;

Figure 5 is a section similar to that shown in Figure 3 illustrating a modified form of screen bottom for the combined conveying and preliminary cleaning means;

Figure 6 is a section taken substantially along the line 6—6 of Figure 5;

Figure 7 is an enlarged side elevation of the distributing means employed in the final cleaning means shown in the embodiment illustrated in Figures 1 and 2;

Figure 8 is an end view of the distributing means shown in Figure 7;

Figure 9 is a plan view of a modified form of harvesting mechanism shown in its mounted relation upon a general purpose tractor with the major portions of the stripping mechanisms omitted;

Figure 10 is a side elevation of the mechanism shown in Figure 9, parts being shown in section;

Figure 11 is an enlarged fragmentary sectional view taken substantially along the line 11—11 of Figure 10;

Figure 12 is a sectional view taken substantially along the line 12—12 of Figure 11;

Figure 13 is an enlarged rear view of the final cleaning mechanism shown in Figures 9 and 10 with parts being shown in section, a portion of the section being taken substantially along the line 13—13 of Figure 9; and Figure 14 is an enlarged section through the final cleaning means of the embodiment illustrated in Figures 9 and 10, such section being taken substantially along the line 14—14 of Figure 13.

Referring now more particularly to the embodiment illustrated in Figures 1 to 8, inclusive, the harvester mechanism illustrated therein is mounted upon a general purpose tractor 21 having rear driving wheels 22 and front dirigible or steering wheels 23. In general, the main operating mechanisms of the harvester comprise stripping and elevating mechanisms 24, combined conveying and preliminary cleaning means 25, final cleaning means 26, and receptacles or containers 27 into which the finally cleaned cotton is deposited and wherein the cotton may be suitably transported to the gin.

Since the stripping mechanisms 24 form the subject matter of the hereinbefore referred to copending applications, the major portions thereof have been omitted for purposes of simplifying the present disclosure. For a more detailed disclosure of the construction, function and operation of such stripping and conveying mechanisms, reference may be had to my hereinbefore noted copending application Serial No. 439,888. Suffice it to say here that such stripping mechanisms 24 each comprises a pair of forwardly and downwardly directed component members each provided with stripping rolls having outwardly directed stripping fingers, the rolls being arranged in proximity to each other with the fingers passing each other in operation in staggered relation. Each of the component members is provided with a stripping plate which is adapted to cooperate with the corresponding or respective stripping roll to remove matter previously removed by the stripping fingers from the plants.

The fingers and stripping plate may, if desired, be of the configuration and cooperative arrangement illustrated in the copending application of Frederick A. Thomann, Serial No. 430,731, filed February 24, 1930, for Harvester, to which reference may be had for a more detailed description of the structure and operation. The stripping plate of each component member of the stripping mechanisms is adapted to guide the matter stripped from the fingers of the corresponding stripping roll to a slatted bottom along which a paddle type conveyor is adapted to direct the deposited matter rearwardly of the component member to be discharged at the rear end thereof. Such stripped matter will of course contain bolls, twigs, stalks and other foreign matter both large and small, some of which will be permitted to drop out through the slatted bottom of the component mechanism to be deposited upon the ground. Each stripping mechanism is adapted to discharge the stripped cotton with whatever foreign matter may eventually reach the discharge end thereof into a combined conveying and preliminary cleaning means 25.

Since each combined conveying and preliminary cleaning means disposed at each side of the tractor for reception and conveyance of cotton from the corresponding stripping mechanism is a substantial duplicate of the other excepting, of course, that one is a right-hand mechanism and the other a left-hand one, this portion of the description will be limited to only one of them.

Each combined conveying and preliminary cleaning means comprises a vertically curved housing 28 closed on three sides and provided preferably with an open-work bottom which will be more specifically hereinafter described. At its forward end, housing 28 is provided with an upwardly directed hopper 29 disposed with its open forward side adjacent to the discharge end of the respective stripping mechanism so as to receive the material discharged by the elevators of the stripping mechanisms. The major portion of the housing 28 is arranged to extend in angular relation upwardly and rearwardly of the tractor with the rear portion thereof curved in substantially arcuate formation so as to conform to the periphery of the corresponding rear wheel of the tractor and to clear the periphery thereof.

Each combined conveying and preliminary cleaning mechanism is supported by means of a substantially U-shaped bracket 31 suitably secured to the inner side of the cleaner housing 28 and having its intermediate portion suitably secured to a transverse angle iron member 32 which extends entirely across the underside of the tractor and is in turn suitably bolted to such underside. Preferably, the brackets 31 are disposed adjacent the front end of the cleaning means. Adjacent the rear end of the housing 28, there is secured to the underside of the housing at its upper end, a vertical supporting member 33, the lower end of such supporting member 33 being bolted to the rear axle housing 34 of the tractor.

Disposed within and suitably supported in the sides of the housing 28 in longitudinally spaced relation, is a series of beaters 35, eight in number being shown in the present embodiment although it will be understood that any number may be used as desired, each beater comprising a sheet metal drum 36 provided with a plurality of longitudinally extending series of radially outwardly directed fingers 37. Each drum 36 is fixedly secured to a shaft 38 suitably journaled in the side walls of the housing 28, each shaft extending through the outer side wall, where the shafts are interconnected for power transmission from one shaft to the other by means of sprocket and chain connections 39. The shaft 38', upon which the second beater from the front end of each conveying and preliminary cleaning means is mounted, extends through the inner walls of both housings 28 from one mechanism to the other and forms a common driving shaft for both mechanisms. A belt pulley 41 is secured to this shaft and is driven by a belt 42 from the conventional belt pulley or fly-wheel 43 of the tractor. The sprocket and chain connections 39 are such that the beaters are all rotated in the same direction, that is, counter-clockwise as viewed in Figure 2. The fingers 37 are of such lengths that adjacent beater fingers just clear each other.

In the embodiment illustrated in Figures 1 to 4, inclusive, the openwork bottom of each combined conveying and preliminary cleaning means comprises a screen 44 preferably formed of a series of transverse slats 45 mounted on three longitudinal rods 46 by being successively slid or threaded thereupon, such slats being held in fixed spaced relation by means of spring washers 47 also mounted on the rods 46 by sliding or threading therealong in alternate relation with the slats 45. Screen 44 is formed to partially conform to the curvature of the outer circumferences of the beaters and is supported at the high points on transverse rods 48 suitably secured in the side walls of the housing 28. The center of curvature of the curved or scalloped portions of screen 44 is substantially that of the axis of each of the drums and the high points of the screen are preferably disposed at the highest points permitted by the fingers of the beaters, that is, these high points are carried preferably to a point where they will be just cleared by the fingers of adjacent beaters. Consequently, cotton which is thrown by the fingers of one beater against the fingers of the succeeding beater, is thrown in a tangential line which passes considerably above the axis of the succeeding drum. The fingers of the succeeding drum consequently strike the cotton at a time or point when the cotton is moving substantially in the opposite direction of the path of movement of the fingers. By this arrangement, the beating action of the beaters is increased in efficiency permitting the acquisition of such a beating action as requires fewer beaters than would otherwise be required. Since matter delivered to the combined conveying and preliminary cleaning means comprises cotton and foreign matter which may possibly be carried over by the fingers of the beaters so that a portion of the matter is not caused to travel in one direction only from the reception end to the discharge end of the mechanism but may be thrown up by the rear beaters back towards the front end of the housing 28, a baffle plate 49 is provided between the first and second beaters and is suitably secured to the side walls of the housing 28 to prevent any material from traveling back beyond the second beater roll and from coming in contact with the first beater which might possibly in turn throw such matter back into the hopper 29. While a screen such as is illustrated in Figures 3 and 4 formed of slats is preferable, a screen formed of coarse wire mesh or one of perforated or slotted sheet metal may be employed.

In operation, as the stripped matter is received by the hopper 29, it is picked up by the fingers 37 of the first beater and is then forced around underneath the beater over the top of the screen 44. Inasmuch as the curvature of the screen is substantially that of the outer circumference of the beater, matter which is thrown rearwardly by the fingers of a preceding beater will be thrown rearwardly substantially tangentially of the circumference of the beater fingers. Such tangential direction by the beater causes the cotton throw by one drum or beater against the fingers of the succeeding drum to travel in a line which passes considerably above the axis of the succeeding drum. Thus the fingers of the succeeding drum or beater strike the cotton at a time when it is moving substantially in the opposite direction of the path of movement of the fingers, considerably enhancing the beating efficiency of the beaters. This operation is repeated successively from one beater to the next throughout the combined conveying and preliminary cleaning means until the cotton containing very little foreign matter or very minute particles of foreign matter is finally discharged by the last beater through a discharge opening 51 into the reception end of a final cleaner associated therewith. Due to the high velocity of the beaters, foreign matter such as small sticks, burrs, and bolls are broken up and the greater part thereof forced down between the slats 45 of the screen 44 and deposited on the ground.

Referring now more particularly to Figures 5 and 6, I have illustrated a modified form of combined conveying and preliminary cleaning mechanism screen which is built up in sections. Each section comprises a series of slats 52 threaded or strung on three arcuate-shaped rods 53 and held in fixed spaced relation by means of spacing sleeves 54. The ends of rods 53 are riveted or peened over the end slats of each section to form heads 55 for holding the slats rigidly thereon. A series of transverse supporting rods 56 are mounted and suitably secured to the side walls of the preliminary cleaner housing 28 at points equidistant from the shafts 38 of the beaters. Each section is preferably of a length equal to the distance between the rods 56 upon which the sections are supported. The ends of two adjacent sections are supported from the rods 56 by means of relatively short bolts 57 bent to an angle of approximately ninety degrees and which are adapted to embrace the upper sides of the rods 56 with their bight or intermediate portions. The ends of bolts 57 are threaded and passed through suitable perforations provided in the end slats of each section. Nuts 58 are threaded on both ends of the bolts 57 and, since the end slats of each section extend underneath the rods 56, tightening of the nuts 58 securely clamps the slat sections in position. It will be readily apparent that with this type of screen, any section which may by any chance be injured or which may receive more wear than others may be quickly and readily replaced without necessitating the removal of the entire screen.

As in the case of the screen embodied in the embodiment illustrated in Figures 1 to 4 inclusive, the sections of the screen shown in Figures 5 and 6 are preferably curved to conform to the outer circumference of the beater fingers so that the action or effect upon the cotton being conveyed and preliminarily cleaned will be substantially the same as in the first embodiment described.

At the discharge end of each combined conveying and preliminary cleaning means 25, there is disposed a final cleaning mechanism 26, such final cleaning mechanism being supported on two transverse angle irons 61 which are in turn secured to two longitudinally extending angle irons 62 bolted to the rear axle housings of the tractor. Each final cleaning mechanism 26 comprises a sheet metal housing 63 with a large drum 64 journaled in the side walls of the housing substantially centrally thereof and provided with a plurality of circumferentially disposed rings each having outwardly directed saw-tooth projections cut therein and pointing in the direction of rotation of the drum. Journaled in the side walls of the housing 63 and positioned slightly forwardly of and above the drum 64, is another smaller drum 65 provided with a plurality of spaced spiral ridges 66 on the periphery thereof (see Figures 1, 7 and 8). A doffer drum 67 comprising a body or hub provided with a plurality of radially outwardly directed brushes, is positioned above and preferably slightly to the rear of the vertical axial plane of the drum 64, the brushes thereof being adapted to brush the saw-tooth projections on the drum 64. A second saw-tooth surfaced drum 68 is journaled in the side walls of the housing 63 below and preferably slightly forward of the drum 64. The housing 63 is provided with refuse openings 69 in the front wall and in the bottom thereof in proximity to the smaller saw-toothed drum 68.

A plurality of fixed brushes 71 are provided along the upper transverse edges of the openings 69 and so disposed as to brush the surface of the drum 68. A second doffer 72 provided with a plurality of peripheral radially outwardly directed brushes, is journaled in the side walls of housing 63 and is disposed rearwardly of and slightly below the saw-tooth drum 68 being adapted to brush the saw-teeth on this drum. The rear wall of the housing 63 is provided near the upper portion thereof with a discharge opening 73 coinciding with a similar opening in the adjacent or corresponding receptacle 27 positioned to the rear of the final cleaner mechanism.

Each receptacle 27 is removably supported on a U-shaped frame 74 extending rearwardly of the final cleaner mechanism 26 with the forward ends of the ledge portions thereof suitably secured to the side walls of the final cleaner housing 63. The discharge end of each combined conveying and preliminary cleaning mechanism 25 is funnel shaped to extend the full width of the final cleaner mechanism, as will be evident from Figure 1.

In operation, as the preliminarily cleaned matter is discharged from the rear ends of the combined conveying and preliminary cleaning means 25, it is caught by the saw-tooth projections on the drum 64 of the final cleaner mechanism and carried around to the doffer drum 67. The doffer drum 67 is rotated so as to have a considerably higher peripheral speed than the saw-tooth drum 64 whereby cotton retained by the saw-tooth drum projections is brushed therefrom upon reaching the line of contact and the brushed cotton is thus discharged into the receptacle 27 through the opening 73. Rigge drum 65, which is rotated in the same direction as the drum 64 so that its adjacent surface rotates oppositely thereto, prevents refuse from being carried around with the drum and, due to the spiral ridges 66, the refuse, such as bolls, foreign matter and the like, and cotton clinging thereto are held back in the housing 63, being knocked from the ridge drum 65 in a somewhat lateral direction so that when such material again falls into the drum 65 it is at a point to one side of the path of the incoming preliminarily cleaned matter discharged from the end of the combined conveying and preliminary cleaning means. The cotton and refuse or foreign matter turned back from the drum 64 is caught by the saw-tooth drum 68 and is drawn around, together with such cotton as may be still contained by the refuse, past the brushes 71. The retarding action of these brushes causes the teeth of the drum 68 to pick up the cotton contained by the refuse while the refuse or foreign matter is permitted to drop through the openings 69. The second doffer 72 has a considerably higher peripheral speed than the drum 68 and consequently brushes the cotton clinging to the drum 68 therefrom and throws it against the drum 64. Such cotton as is thrown up by the second doffer 72 is then carried around by the drum 64 and since it contains no refuse, passes the ridge drum 65 and is subsequently brushed from the drum 64 and thrown into the receptacle 27.

The final cleaning means 26 is driven through a sprocket and chain connection 75 from the shaft of the last beater of the corresponding combined conveying and preliminary cleaning mechanism, the shaft of doffer drum 67 constituting the drive shaft for the final cleaner mechanism. The ridge drum 65 and the lower saw-tooth drum 68 are driven by means of a belt 76 which passes around pulleys 77, 78 and 79, each mounted on the corresponding end of the shafts of drums 67, 65, and 68, respectively. Drum 64 is driven from the shaft of drum 68 through a gear 81 and a pinion 82, gear 81 being mounted on the end of the shaft of drum 64 and pinion 82 being mounted on the end of the shaft of drum 68. Doffer drum 72 is driven through a gear (not shown) meshing with the pinion 82.

Referring now more particularly to Figures 9 to 14 inclusive, I have illustrated a modified embodiment of the invention likewise carried by a general purpose tractor in association with improved stripping means. Since the stripping means forms the subject matter of my above noted copending application Serial No. 519,926, the major portions of such stripping mechanisms have been omitted to simplify the instant disclosure. For a more specific description of the construction, function and operation of such stripping mechanism, reference may be had to the aforementioned copending application.

As in the case of the first embodiment disclosed herein, the mechanism illustrated in Figures 9 to 14 inclusive, is mounted upon a general purpose tractor 91 provided with rear driving wheels 92 and front dirigible or steering wheels 93. The tractor is also provided with power take-off means 94 and power lift means 95.

Generally, the main operating devices of the harvester comprise stripping and elevating mechanisms 96, combined conveying and preliminary cleaning means 97, a final cleaner 98, and a centrally disposed discharge elevator conveyor 99.

Since the stripping mechanisms 96 do not form the subject matter of the instant application, suffice it to say here that each mechanism comprises a forwardly and downwardly inclined pair of component parts one of which embodies a rotatable stripping roll and a stripping plate for removing stripped matter from the stripping roll preferably of the type and cooperation shown in the aforementioned application of Frederick A. Thomann, and conveying means preferably comprising a plurality of beater rolls arranged in longitudinally spaced relation within this component member of the stripping mechanism to concurrently convey stripped matter and subject it to a simultaneous beating or agitating operation. At its discharge end each component conveyor containing member has associated therewith the reception end of a corresponding combined conveying and preliminary cleaning means 97.

Since the two combined conveying and preliminary cleaning means are substantial duplicates of each other, except, of course, that one is a left-hand mechanism and the other a right-hand, this portion of the description of the combined conveying and preliminary cleaning means will be limited to one of them.

Referring now more particularly to Figures 9 to 12, inclusive, each combined conveying and preliminary cleaning means 97 comprises a vertically curved housing 101 closed at the top and sides thereof and provided with a coarsely reticulated screen 102 forming the bottom thereof. At its reception end the screen 102 is supported by a transverse bracket 103 which also has the rear edge of a concave plate 104 suitably connected thereto. This concave plate is adapted to cooperate with the last fingered member 105 of the stripping mechanism to insure of direction of matter operated upon by member 105 positively into the associated combined conveying and preliminary cleaning means. The last fingered member 105 is disposed at the discharge end of the associated stripping mechanism and is shorter in length than the width of the associated combined conveying and cleaning means. Consequently, a baffle wall 106 is provided to close off the space to the rear of a bearing bracket 107 to prevent return delivery of matter being conveyed and cleaned by the combined conveying and preliminary cleaning means to the stripping mechanism. Associated with the baffle wall 106 is a second baffle plate 108 extending across the upper portion of the space defined by the top and side wall of the combined conveying and preliminary cleaning means housing 101, such baffle plate being inclined upwardly and rearwardly to direct such matter as may be thrown up by the fingers of the last fingered member 105 rearwardly of the housing 101. Similarly, a plurality of spaced apart baffle plates 109 are provided between pairs of beaters arranged within the housing 101 to prevent the cotton from being thrown back over the beaters toward the forward end of the mechanism. As will be more readily apparent from Figures 10 and 12, these plates 109 preferably extend downwardly to a point where the lower edges thereof will just clear the fingers of the beaters as will be more specifically hereinafter explained. Such arrangement prevents the return of cotton to the first beater, thereby avoiding overloading thereof. As will be more readily apparent from Figure 10, the rear portion of the housing 101 is curved upwardly and rearwardly and then downwardly, so as to be disposed above and to clear the periphery of the rear driving wheel 92 of the tractor.

Each combined conveying and preliminary cleaning means is supported at its forward end upon a pair of substantially U-shaped brackets 111 and 112, disposed at right angles to each other with the intermediate portions thereof suitably secured to the respective flanges of a transversely extending angle bar 113, which extends across the underside of the tractor and is suitably connected or supported from the frame of the tractor providing a common support for the two combined conveying and preliminary cleaning means 97. At the rear end, each combined conveying and preliminary cleaning means is supported upon a pair of vertically disposed brackets 114, the lower ends of which may be suitably secured to the rear axle housings 115 of the tractor.

Each mechanism 97 has mounted therein in longitudinally spaced relation a series of beaters 116, any preferred or desired number of which may be employed. Each beater 116 comprises a sheet metal drum or hub 117 provided with a series of radially outwardly projecting fingers 118. Each drum is fixedly secured upon a shaft 119 journaled in suitable anti-friction bearings 121 supported in the two side walls of the housing 101, each shaft extending through the outer side wall where the shafts are connected, one with another, through sprocket and chain connections 122. Preferably, the foremost beater 116 is provided with a slip clutch 123 normally maintained in cooperative engagement by a pressure spring 124, the slip-clutch 123 providing a connection between the driving sprocket 125 and sprocket 126, carried by the shaft of the last fingered member 105. Driving sprocket 125 is driven by sprocket 126 by means of a chain 127.

Drive for both the stripper mechanism operating parts and the beaters is transmitted from the tractor power take-off means 94 by means of an articulated line of shaft 128 (see Fig. 10) the forwardmost shaft 129 of which transmits power through a set of beveled gears 131, suitably disposed in a gear box 132 secured to the inner side of the corresponding stripping mechanism 96, power being transmitted through the gears to a horizontally disposed shaft 133 extending through the bearing bracket 107 through the stripping mechanism and carrying thereon the fingered member 105 and sprocket 126. Drive for the fingered elements of the stripping mechanism is transmitted thereto by means of a sprocket chain 134. Shaft 133 extends across to the right-hand side of the entire mechanism to transmit power to the operating parts of the stripping means and combined conveying and preliminary cleaning means disposed upon that side of the tractor. As in the case of the combined conveying and preliminary cleaning means illustrated in Figures 1 to 8, inclusive, the screen 102 is preferably bent to partially conform to the curvature of the outer peripheries of the beaters 116, the high points of the screen being suitably supported upon a series of spaced brackets similar to bracket 103.

The operation of the combined conveying and preliminary cleaning means 97 is similar to that of the combined conveying and preliminary cleaning means 25 with the exception that the hopper of the latter is eliminated, the cooperative association between the stripping mechanism 96 and the combined conveying and preliminary cleaning means 97 being such that the effective combined transport and beating action of the fingered elements provided in the stripping mechanism and the beaters 116 of the combined conveying and preliminary cleaning means is, in effect, a continuous operation practically from the introduction of the stripped matter to the bottom of the stripping mechanism to the discharge thereof from the combined conveying and preliminary cleaning means. In addition, the provision of the baffle plates 109 between the pairs of beaters 116, prevents the cotton being conveyed and simultaneously beaten or agitated in the combined conveying and preliminary cleaning means 97 from finding its way back to the reception end of the means 97, thereby materially improving the conveying function of the means and at the same time reducing the possibility of overload of any portion of the means.

As the stripped matter progresses from the reception end of the combined conveying and preliminary cleaning means to the discharge end thereof, a substantial portion of the larger particles of foreign matter will be removed by the agitation and dropped to the ground through screen 102 until the cotton, containing very little foreign matter or only fine particles of such matter is finally discharged by the last beater into a chute 136 which in turn discharges into one of the two receiving hoppers or openings 137 of the final cleaner 98 (see Fig. 14).

In the present embodiment the final cleaner 98 is preferably a single mechanism which is adapted to receive the cotton discharged by each of the combined conveying and preliminary cleaning means 97, such reception taking place, preferably, adjacent the ends of the final cleaning mechanism 98.

Final cleaner 98 comprises a substantially rectangular housing 138 open at the bottom and forward side and supported at its rear edge upon an angle iron 139 extending transversely across and to the rear of the tractor 91 and in turn supported from the sides of the gear housings 115 of the tractor by a pair of rearwardly extending angle iron members 141, the forward ends of which are preferably pivotally connected to the lower forward edge of the gear housings 115. A pair of brackets 142 are suitably secured to the inner walls of the gear housings 115 and are provided adjacent their rear ends with a plurality of vertically disposed perforations 143 which are adapted to adjustably receive a securing pin for maintaining the rearwardly extending angle iron arms 141 in desired vertically adjusted position. Angle iron 139 preferably extends across the lower edge of the final cleaning means housing 138 so as to provide a support therefor.

Referring now more particularly to Figures 13 and 14, the final cleaning means 98 comprises a relatively large drum 144 journaled substantially centrally of and in the side walls of the housing 138, and provided with a plurality of peripherally supported, axially abutting rings, each having peripheral saw-tooth projections cut therein and pointing in the direction of rotation of the drum which is indicated by the arrow in Figure 14. Journaled in the side walls of the housing 138 and positioned slightly forwardly of and above the drum 144, is another smaller drum 145, provided with a series of spiral ridges 146 extending longitudinally of the periphery thereof, in the same manner as the spirally rigid drum illustrated in Figures 7 and 8, except, of course, that drum 145 is considerably longer and extends across the entire casing 138.

A doffer drum 147 comprising a plurality of peripherally arranged, radially outwardly extending brushes, is positioned above and preferably slightly to the rear of the vertical axial plane of the drum 144, the bristles of drum 147 being adapted to brush the saw-tooth projections on the drum 144 in a direction rearwardly of the housing 138. A second saw-tooth surfaced drum 148 is journaled in the side walls of the housing 138 below and preferably slightly forwardly of the drum 144. A refuse opening 149 is provided in the front wall of the housing 138 in proximity to the drum 148. Fixed brushes 151 are provided along the transverse edges of the opening 149 and are so arranged that the upper brush will brush the surface of drum 148 for discharging refuse through the opening 149 while the lower brush similarly removes refuse adapted to be discharged through the open bottom of the housing 138. A second doffer 152 provided with a plurality of peripherally disposed brushes, is journaled in the side walls of the housing 138 and is positioned rearwardly of and slightly below the drum 148 being adapted to brush the saw-teeth of the drum 148. A baffle plate 153 is arranged to extend across the housing 138 from the rear thereof downwardly beneath the drum 144 and underneath the second doffer 152 providing a discharge opening between its forward edge and the lower brush 151. Doffer 152 rotates in a clockwise direction as viewed in Figure 14 to remove cotton from drum 148 and to direct such removed cotton to the drum 144.

Suitably secured to the rear side of the final cleaner housing 138 is an auger conveyor housing 154 extending across the rear side of the final cleaner 98. Housing 154 carries therein at each side an auger 155 which is adapted to convey matter received from the final cleaning mechanism through a discharge opening 156 toward the axial center of the entire mechanism, the spirals of auger 155 being directed as clearly shown in Figure 13.

Augers 155 are preferably mounted upon a common tubular shaft 157, the augers terminating at their inner ends in spaced relation providing a discharge space therebetween.

A discharge elevator conveyor 99 adapted to receive matter discharged by the augers 155 has its reception end disposed in the space defined between the discharge ends of the augers 155. This conveyor 99 is supported upon a pair of rearwardly extending angle iron arms 158 suitably secured at their forward ends to the transversely extending angle iron 139 in spaced relation substantially midway of the member 139. Elevator conveyor 99 extends forwardly into the intermediate portion of a substantially U-shaped housing 159 communicating with the central opening of the housing 154, the rear edges of housing 159 being suitably reinforced by straps 161 suitably secured at their lower ends to the extreme rear ends of the supporting arms 158 and defining the inner reinforcing edges of the housing 159.

Conveyor elevator 99 comprises a housing 162 the forward lower end web portion of which is formed upon an arc to conform to the curvature of the lower rear end of the web portion of the housing 159 and to cooperate therewith upon vertical swinging movement of the conveyor and elevator 99 for varying the elevation of the discharge end thereof for accommodation to transport vehicles adapted to receive cotton discharged by the entire mechanism and which may be suitably connected by any preferred or desired draft means to the tractor. A shaft 163 is suitably journaled adjacent the forward lower end of the housing 162 and extends through the side walls of the housing 159 providing a pivot for the housing 162. Shaft 163 carries thereon a sprocket 164 disposed centrally of the side walls of the housing 162, a suitable sprocket chain 165 cooperating with the sprocket wheel 164 and being provided with a plurality of transverse arms 166 constituting the conveyor means. The upper end of the endless chain 165 may be similarly carried over a suitable idler sprocket.

Extending across and suitably secured to the side walls of the housing 162 is a supporting plate 167 upon which the chain 165 is adapted to ride in a longitudinally extending guide groove 168, the upper surface of plate 167 serving as a support for the cross arms 166 and for cotton discharged thereupon by the augers 155. At its reception end, housing 162 is provided with a suitable enclosing canopy or shield 169 cooperating with a rearwardly extending shield 171 secured to the upper side web portions of housing 159, the canopy 169 being disposed inwardly of the shield 171 a sufficient distance to accommodate vertical adjustments of conveyor elevator 99.

That portion of shaft 157 which is disposed in the space defined between the augers 155 and is confined in the housing 159, has secured thereto a pair of flexible flap members 172 with the inner ends thereof extending tangentially of the shaft 157 and being suitably retained thereon by a pair of diametrically opposed metal strips 173 in turn secured to the shaft 157 by means of a plurality of bolts or rivets 174. Flaps 172 are considerably longer than the radial dimension of the augers 155 so that in passing over the web portion of the housing 159 they will be reversely bent as clearly shown in Figure 14. As each flap 172 approaches the discharge opening 156, it tends to straighten out so that such matter as is being discharged by the opposed augers 155 is received thereupon and due to centrifugal force when the end of the flap member 172 is freed from the web portion of the housing 159, it will straighten out and carry the discharged cotton over to the upper supporting side of the plate 167 for engagement thereof by the conveyor chain and cross members thereof. In passing over the conveyor, each flap member 172 is flexed in the opposite direction forming a guard baffle for such matter as is about to be thrown rearwardly by the succeeding or following flap, thereby insuring of positive feeding of the discharged cotton to the conveyor. This eliminates the possibility of congestion at the reception end of the conveyor and insures a positive and direct feed to the discharge conveyor of such capacity as to accommodate the demands as may be placed thereupon due to the continuous operation of the entire mechanism as it is moving down the plant row or rows.

Referring now more particularly to Figures 9 and 10, it will be noted that the conveyor elevator 99 is suitably braced from the rear ends of the combined conveying and preliminary cleaning means housings by a pair of chains 175. These chains may have adjustable connection at either end with the associated mechanism of any preferred or desired form so that the angular disposition of the conveyor elevator 99 may be adjusted for accommodation to the varying heights of such transport vehicles as may be employed for removing cotton from the field to the gin.

The final cleaning means and the associated moving parts are operated as follows:

A sprocket chain 176 is driven by a suitable sprocket wheel 177 secured to the outer extending end of the shaft of the last beater 116 of the combined conveying and preliminary cleaning means 97. This chain has its upper run passing over a sprocket 178 suitably secured to the outwardly extending end of the shaft 179 of the upper doffer 147, thence around a large sprocket 181 suitably secured to the outer extending end of shaft 182 of the second toothed drum 148, the lower run of chain 176 then passing over a sprocket 183 secured to the outer extending end of shaft 184 of the spreading or spirally ridged drum 145. Thus, the toothed drum 148, spreader drum 145, and doffer 147 are driven by the same chain with the toothed drum 148 and doffer 147 rotating in the same direction while the spreader drum 145 is rotated in the opposite direction as indicated by the arrows in Figure 14. At its right-hand outwardly extending end and outwardly of the housing 138, shaft 185 has a substantial spur gear 186 suitably keyed or otherwise secured thereto, such gear meshing with a similarly disposed gear 187 secured to the extending end of shaft 182 of the toothed drum 148. Beyond the spur gear 186, shaft 185 also has a sprocket 188 secured thereto with which a chain 189 cooperates to drive a sprocket 191 secured to the inner extending end of the shaft 192 of the lower doffer 152. Consequently, drum 144 is driven from drum 148, drum 144 in turn furnishing driving power to the doffer 152.

Shaft 185 carries a sprocket 193 suitably keyed or otherwise secured thereto at its left-hand outwardly extending end, a sprocket chain 194 passing over sprocket 193. The upper run of chain 194 passes over a sprocket 195 secured to the outwardly extending end of shaft 157, and thence over a sprocket 196 suitably secured to the outer extending end of shaft 163, returning over the sprocket 193. Thus the augers and the conveyor 165 of the elevator conveyor 99 are driven from the cleaning drum 144.

The operation of the final cleaning mechanism 98 is similar to that of each of the final cleaning mechanisms 26 hereinbefore described in conjunction with the embodiment of the invention illustrated in Figures 1 to 8, inclusive, and reference may be had thereto for a more detailed description of the function and operation of internal mechanisms of means 98.

It will be readily apparent that in conjunction with the instant modification, the entire harvesting and cleaning function of the machine is substantially a continuous operation from the stripping mechanisms to the final discharge of the preliminarily and finally cleaned cotton from the discharge end of the elevator conveyor 99 into the transport vehicle.

If so desired, a suitable receptacle retaining means may be provided at the discharge end of the elevator conveyor 99 for purposes of removably receiving the upper open ends of flexible portable receptacles, such for example as baskets or bags which may be successively filled and then lowered upon a conveyance for transport to the gin.

Suitable shielding, particularly of the canopy type, may be provided upon the outer side of each combined and preliminary cleaning means to suitably shield the sprocket and chain connections transmitting power to the operating parts of the mechanism.

It will be noted that in the case of each embodiment herein disclosed, the construction and arrangement of the combined conveying and preliminary cleaning means is such that it is readily accommodated to support upon a general purpose tractor requiring no modification or alteration of the tractor itself. The structure is such as to provide a compact arrangement conforming to the contour of the rear driving wheels without materially enlarging the overall width of the associated mechanism in its assembled relation upon the tractor. The arrangement is further such that maximum efficiency of operation is derived from a minimum sized structure rendering the mechanism compact as well as efficient in operation. All of the parts of each embodiment have been designed with a view to readily accommodate variations in crop yield which may be encountered in the course of constant movement of the mechanism down a plant row or rows, the mechanism embodying novel features to eliminate possibility of overload at any point in the train of operation due to such variations in crop yield as may be encountered.

While I have disclosed several preferred embodiments of my invention, it will be understood that I do not wish to be limited thereto. As will be understood by those skilled in the art certain changes may be made therein without departing from the essence of the invention or the spirit and scope of the appended claims.

What I claim and desire to secure by Letters Patent is:

1. The combination with a conveying and cleaning means having a housing and a series of longitudinally disposed beaters journaled therein, of transverse bars supported by said housing a screen disposed under and in spaced relation to said beaters comprising a series of sections and means for detachably connecting said sections together, said means being supported on said bars and serving thereby to support said sections.

2. The combination with a conveying and cleaning means having side walls and a top, and a series of longitudinally disposed beaters journaled between said side walls, of transverse supporting rods extending below and between adjacent beaters, screen sections disposed between said supporting rods comprising transversely disposed slats, and connecting bolts secured to the adjacent end slats of adjacent sections and embracing said transverse supporting rods to retain said screen sections on said conveying and cleaning means.

3. The combination with a conveying and cleaning means having side walls and a top, and a series of longitudinally disposed beaters journaled between said side walls, of transverse supporting rods extending below and between adjacent beaters, screen sections disposed between said supporting rods including bolts removably secured to the adjacent end slats of adjacent sections and embracing said transverse supporting rods to retain said screen sections on said conveying and cleaning means.

4. In a cotton harvester, in combination, a single final cleaner, oppositely acting auger conveyors receiving cotton discharged by said cleaner and conveying the cotton toward the center of the cleaner, said conveyors terminating in spaced relation at their inner ends, and an elevator conveyor having its reception end disposed in the space defined by said inner ends, and flexible means adapted to receive cotton from the inner ends of said auger conveyors and adapted to deposit the cotton upon said elevator conveyor.

5. In a cotton harvester, in combination, a single final cleaner, auger conveyors receiving cotton discharged by said cleaner, said conveyors terminating in spaced relation at their inner ends and adapted to conduct the cotton toward the space defined by said inner ends, a common shaft for said auger conveyors traversing said space, an elevator conveyor having its reception end disposed in said space below said shaft, and flexible members secured to said shaft in said space and adapted to wipe over the reception end of the elevator conveyor for positively delivering cotton discharged by said auger conveyors to the elevator conveyor.

6. In a cleaner of the class described, a housing having a restricted opening for receiving material comprising cotton and refuse, a cotton discharge opening and a refuse discharge opening, a cotton conveying cylinder arranged in said housing with one end adjacent to said restricted opening and the other end remote therefrom, means for removing cotton from said conveying cylinder and for discharging the removed cotton through said discharge opening, a second cotton conveying cylinder positioned in proximity to said refuse discharge opening, means for removing refuse from said second cotton conveying cylinder, means for removing cotton from said second cotton conveying cylinder and discharging the removed cotton against said first cotton conveying cylinder, and spiral means cooperating with one of said cylinders for moving at least a part of the conveyed material laterally along said one cylinder and away from the path of movement of the incoming material entering through said restricted opening, said spiral means serving to move the cotton to be acted upon by different portions of said cylinders and returning a portion of said material to the receiving portion of said housing to be partially reconveyed and reacted upon by different sections of said cylinders.

FRANK T. COURT.